(12) United States Patent
Otsuka et al.

(10) Patent No.: US 11,309,750 B2
(45) Date of Patent: Apr. 19, 2022

(54) MOTOR WITH OPTIMIZED DIMENSIONAL RELATIONSHIPS

(71) Applicant: MINEBEA MITSUMI Inc., Nagano (JP)

(72) Inventors: Makoto Otsuka, Kawegawa (JP); Koji Kebukawa, Kawegawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 138 days.

(21) Appl. No.: 16/634,672

(22) PCT Filed: Jul. 27, 2018

(86) PCT No.: PCT/JP2018/028233
§ 371 (c)(1),
(2) Date: Jan. 28, 2020

(87) PCT Pub. No.: WO2019/026788
PCT Pub. Date: Feb. 7, 2019

(65) Prior Publication Data
US 2020/0212732 A1  Jul. 2, 2020

(30) Foreign Application Priority Data

Aug. 2, 2017  (JP) .............................. JP2017-149645

(51) Int. Cl.
*H02K 1/16* (2006.01)
*H02K 3/12* (2006.01)
(Continued)

(52) U.S. Cl.
CPC ............... *H02K 1/16* (2013.01); *H02K 1/146* (2013.01); *H02K 1/2706* (2013.01);
(Continued)

(58) Field of Classification Search
CPC ........ H02K 1/146; H02K 1/2706; H02K 1/06; H02K 1/165; H02K 1/278; H02K 2213/03
See application file for complete search history.

(56) References Cited

U.S. PATENT DOCUMENTS 6,940,205 B1     9/2005  Murakami et al.
8,633,626 B2 *   1/2014  Miyajima ............... H02K 23/04
                                                310/154.22
(Continued)

FOREIGN PATENT DOCUMENTS

CN       1933285 A      3/2007
CN     101868901 A     10/2010
(Continued)

OTHER PUBLICATIONS

Translation of FR-3041182-A1 with numbered pages and lines, 2017.*
(Continued)

*Primary Examiner* — Quyen P Leung
*Assistant Examiner* — Christopher Stephen Schaller
(74) *Attorney, Agent, or Firm* — Pearne & Gordon LLP

(57) ABSTRACT

A driving apparatus according to an embodiment includes an arm, an operation target, and a brake unit. The arm has one end supported by a support mechanism, and includes an electric driving source. The operation target is attached to the other end of the arm, the other end being an end on the opposite side of the one end, and is enabled to be pivoted by the driving source about one rotational axis intersecting with a direction from the one end to the other end. The brake unit secures immobility of a target gear that is a gear disposed in the arm, and that is a gear being rotated as the operation target is pivoted, when the power supply to the driving source stops.

3 Claims, 6 Drawing Sheets

(51) Int. Cl.
*H02K 1/14* (2006.01)
*H02K 3/18* (2006.01)
*H02K 1/2706* (2022.01)
*H02K 15/02* (2006.01)
*H02K 21/16* (2006.01)

(52) U.S. Cl.
CPC .......... *H02K 15/024* (2013.01); *H02K 21/16* (2013.01); *H02K 2213/03* (2013.01)

(56) References Cited

U.S. PATENT DOCUMENTS

| | | |
|---|---|---|
| 2005/0225194 A1 | 10/2005 | Murakami et al. |
| 2007/0205687 A1 | 9/2007 | Murakami et al. |
| 2007/0205688 A1 | 9/2007 | Murakami et al. |
| 2009/0108702 A1 | 4/2009 | Mock |
| 2009/0111072 A1 | 4/2009 | Lombardo et al. |
| 2015/0102700 A1 | 4/2015 | Maeda |
| 2017/0047797 A1 | 2/2017 | Darras et al. |
| 2018/0020923 A1 | 1/2018 | Maeda |

FOREIGN PATENT DOCUMENTS

| | | | |
|---|---|---|---|
| CN | 104578490 A | 4/2015 | |
| CN | 105703569 A | 6/2016 | |
| CN | 105790458 A | 7/2016 | |
| CN | 106415995 A | 2/2017 | |
| CN | 106972655 A * | 7/2017 | |
| FR | 3020201 A1 * | 10/2015 | ............. H02K 1/165 |
| FR | 3041182 A1 * | 3/2017 | ............... H02K 3/12 |
| JP | H11-89197 A | 3/1999 | |
| JP | 2001-103721 A | 4/2001 | |
| JP | 2003-224941 A | 8/2003 | |
| JP | 2006-217740 A | 8/2006 | |
| JP | 2006-280022 A | 10/2006 | |
| JP | 2014-087143 A | 5/2014 | |
| JP | 2016-158402 A | 9/2016 | |
| WO | WO-2017042485 A1 * | 3/2017 | ............. H02K 21/16 |

OTHER PUBLICATIONS

CN106972655A Proquest Translation, 2017.*
FR3020201A1 Espacenet Translation, 2015.*
WO 2017042485 Espacenet Translation, 2017.*
English translation of the Written Opinion dated Oct. 30, 2018 for corresponding International Application No. PCT/JP2018/028233.
First Chinese Office Action dated May 28, 2021 for corresponding Chinese Application No. 201880048973.9 and English translation.
Notice of Reasons for Refusal dated Jun. 28, 2021 for corresponding Japanese Application No. 2017-149645 and English translation.
International Search Report dated Oct. 30, 2018 for corresponding International Application No. PCT/JP2018/028233.
Written Opinion dated Oct. 31, 2018 for corresponding International Application No. PCT/JP2018/028233.
Notice of Reasons of Refusal for Japanese Application No. 2017-149645 dated Nov. 25, 2020 with English Translation.
Decision of Refusal dated Jan. 24, 2022 for corresponding Japanese Application No. 2017-149645 and English translation.
Second Office Action dated Jan. 4, 2022 for corresponding Chinese Application No. 201880048973.9 and English translation.

* cited by examiner

FIG.2

| | P1 | P1 | P1 | P1 | P1 | P1 | P1 |
|---|---|---|---|---|---|---|---|
| OUTSIDE DIAMETER OF STATOR (A) | 47mm | 47mm | 47mm | 47mm | 47mm | 47mm | 47mm |
| OUTSIDE DIAMETER OF ROTOR (B) | 12mm | 12mm | 12mm | 12mm | 12mm | 12mm | 12mm |
| INSIDE DIAMETER OF STATOR (C) | 18mm | 18mm | 18mm | 18mm | 18mm | 18mm | 18mm |
| THICKNESS OF YOKE (D) | 3mm | 4mm | 5mm | 6mm | 7mm | 8mm | 9mm |
| AIR GAP | 3mm | 3mm | 3mm | 3mm | 3mm | 3mm | 3mm |
| STATOR MAGNETIC FLUX DENSITY | 0.92T | 0.73T | 0.56T | 0.48T | 0.40T | 0.37T | 0.33T |
| IRON LOSS (PREDICTED VALUE) | 52.6 | 34.0 | 20.6 | 15.5 | 11.0 | 9.5 | 7.7 |
| WINDING SPACE | 47.1mm$^2$ | 39.9mm$^2$ | 33.2mm$^2$ | 27.1mm$^2$ | 21.5mm$^2$ | 16.4mm$^2$ | 11.8mm$^2$ |
| NUMBER OF WINDING TURNS | 16 | 16 | 16 | 16 | 16 | 16 | 16 |
| M/W DIAMETER | 1 | 0.95 | 0.90 | 0.85 | 0.7 | 0.60 | 0.50 |
| STANDARD SHEATH OUTSIDE DIAMETER | 1.12 | 1.03 | 0.94 | 0.91 | 0.758 | 0.66 | 0.56 |
| SPACE FACTOR | 33.6% | 33.6% | 33.6% | 33.6% | 33.6% | 33.6% | 33.6% |
| M/W CONDUCTOR RESISTANCE VALUE — Ω/km | 21.95 | 24.32 | 27.1 | 30.38 | 44.80 | 60.98 | 109.2 |
| M/W CONDUCTOR RESISTANCE VALUE — RATIO | 0.490 | 0.543 | 0.605 | 0.678 | 1 | 1.361 | 2.438 |
| COIL RESISTANCE VALUE | 0.0245Ω | 0.0271Ω | 0.0302Ω | 0.0339Ω | 0.05Ω | 0.0681Ω | 0.1219Ω |

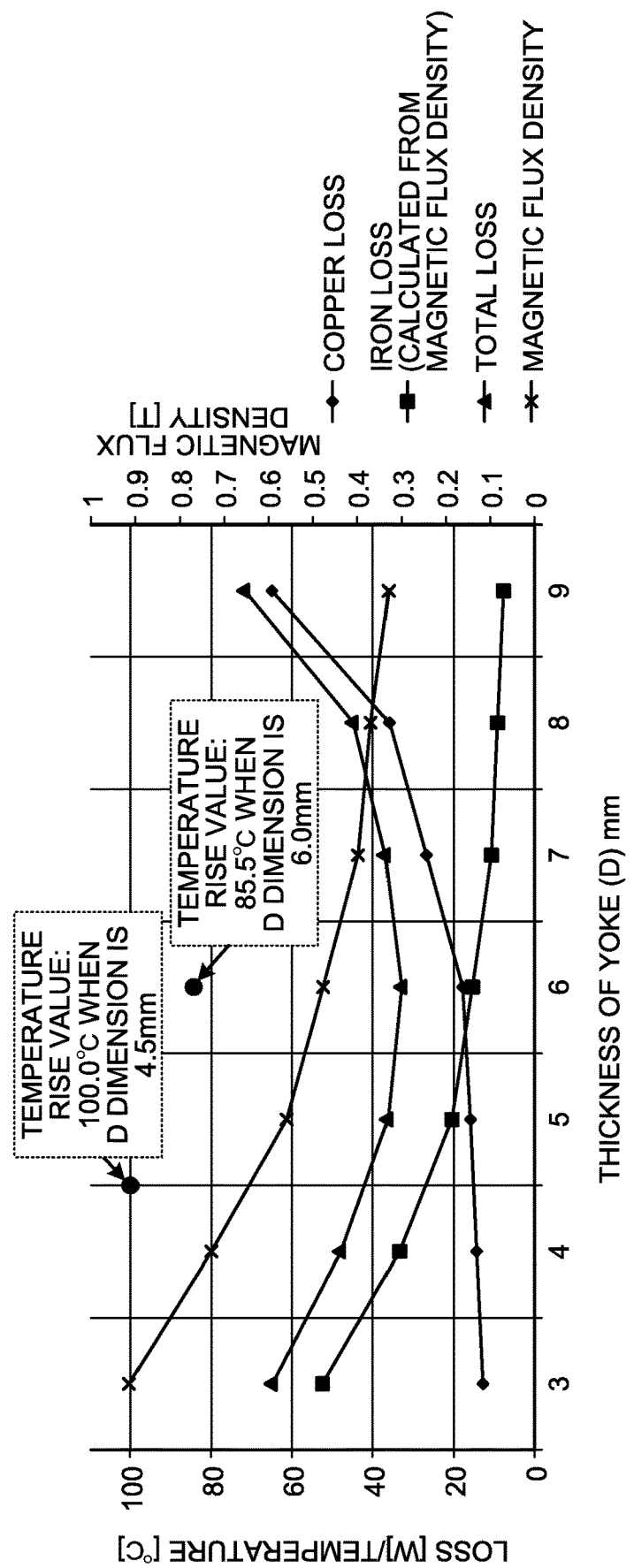

FIG.5
| | P2  | P2  | P2  | P2  | P2  |
|---|---|---|---|---|---|
| OUTSIDE DIAMETER OF STATOR (A) | 47mm | 47mm | 47mm | 47mm | 47mm |
| OUTSIDE DIAMETER OF ROTOR (B) | 12mm | 12mm | 12mm | 12mm | 12mm |
| INSIDE DIAMETER OF STATOR (C) | 14mm | 16mm | 18mm | 20mm | 22mm |
| THICKNESS OF YOKE (D) | 7mm | 7mm | 7mm | 7mm | 7mm |
| AIR GAP | 1mm | 2mm | 3mm | 4mm | 5mm |

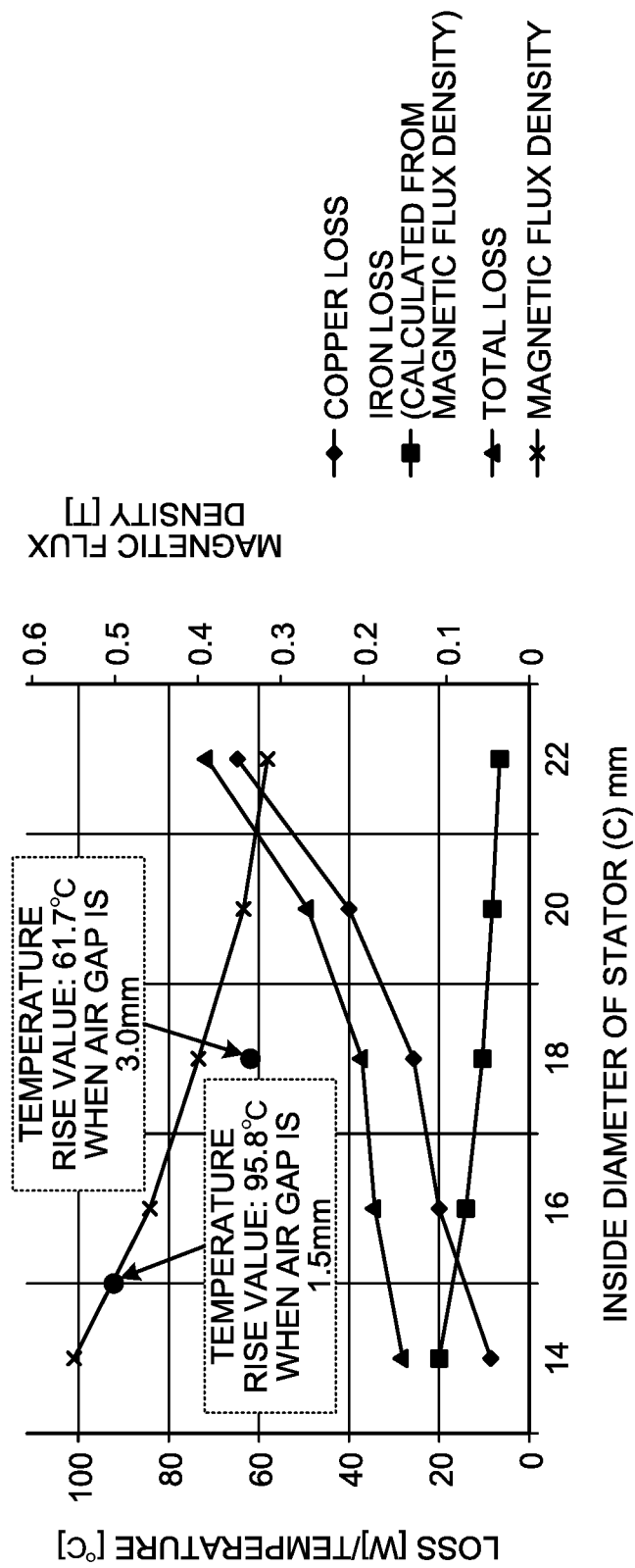

MOTOR WITH OPTIMIZED DIMENSIONAL RELATIONSHIPS

FIELD

The present invention relates to motors.

BACKGROUND

Motors, which are used in a fan, for example, have undergone enhanced speed of rotation in recent years. For example, a technology has been proposed for a motor in which the dimensional ratio between a stator, a rotor, and the like is optimized, thereby balancing an iron loss and a copper loss that occur along with rotation at a high speed exceeding 50,000 rpm and achieving enhanced efficiency in the motors (see Patent Literature 1, for example).

CITATION LIST

Patent Literature

Patent Literature 1: Japanese Patent Application Laid-open No. 2006-280022

SUMMARY

Technical Problem

However, it cannot be said that the dimensional ratio between a stator and a rotor is always optimized in conventional technologies. That is to say, previously, there has been room for improvement in reducing a motor loss, such as an iron loss and a copper loss.

The present invention has been made in view of the foregoing, and it is an object of the invention to provide a motor in which a motor loss can be reduced during high-speed rotation.

Solution to Problem

It is an object of the present invention to at least partially solve the problems in the conventional technology. A motor according to an embodiment includes a stator and a rotor. The stator includes a yoke and teeth that protrude from the yoke. The rotor has the outside diameter the ratio of which to the outside diameter of the stator is equal to or less than 0.3. The stator has the thickness of the yoke the ratio of which to the outside diameter of the stator is 0.1 to 0.15.

Advantageous Effects of Invention

According to an aspect of the present invention, a motor can be provided in which a motor loss can be reduced during high-speed rotation and motor efficiency can be improved.

BRIEF DESCRIPTION OF DRAWINGS

FIG. 2 is a diagram illustrating a result of a simulation in which the thickness of a yoke is varied.

FIG. 3 is a diagram illustrating the result of the simulation in which the thickness of the yoke is varied.

FIG. 5 is a diagram illustrating conditions for a simulation in which the inside diameter of a stator is varied.

FIG. 6 is a diagram illustrating a result of the simulation in which the inside diameter of the stator is varied.

DESCRIPTION OF EMBODIMENTS

Figure 1:
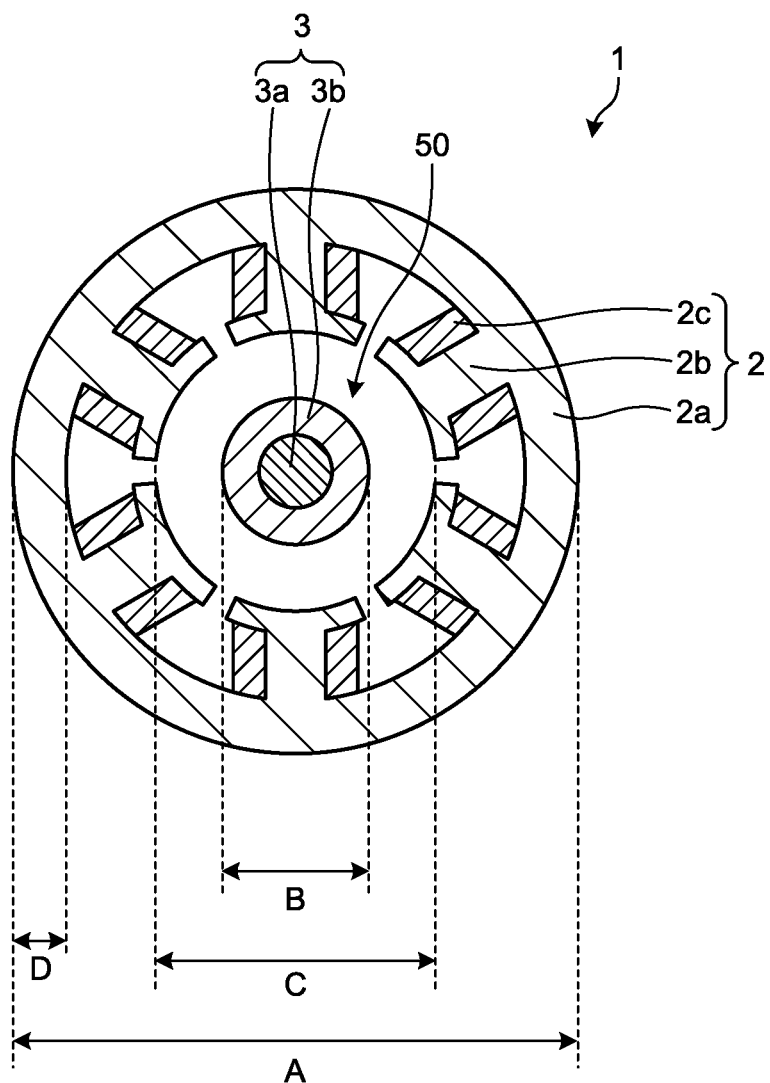
FIG. 1 is a view illustrating a motor according to an embodiment.

A motor according to an embodiment will be described below with reference to the drawings. Dimensional relations between components in the drawings, ratios between the components, and the like may differ from those in actuality. The drawings may include portions in which dimensional relations and ratios differ from each other.

A motor 1 according to the embodiment will be described first with reference to FIG. 1. FIG. 1 is a view illustrating the motor 1 according to the embodiment. A case will be described below in which the motor 1 is an inner rotor brushless motor.

As illustrated in FIG. 1, the motor 1 according to the embodiment includes a stator 2 and a rotor 3. The stator 2 is a stator in the motor 1, and is formed by a plurality of plate-shaped metal members, such as soft magnetic steel sheets, including silicon steel sheets and electromagnetic steel sheets, for example.

The stator 2 has an annular yoke 2a, a plurality of teeth 2b, and a coil 2c. The stator 2 also has a relatively small shape with an outside diameter A being equal to or less than 50 mm. The teeth 2b protrude from the inner peripheral surface of the yoke 2a to the inside in the radial direction. As illustrated in FIG. 1, six pieces of teeth 2b are placed at regular spacings in the circumferential direction, facing two teeth 2b are paired with each other, and each of the pairs correspond to respective phases (U phase, V phase, W phase) of a three-phase magnetic circuit. The number of the teeth 2b is not limited to six, and may be three or nine as long as the number enables a three-phase magnetic circuit to be formed.

The coil 2c is formed by conducting wires being wound around the respective teeth 2b. The conducting wires are members in which metal wires, for example, copper wires, are covered with an insulating member, such as resin.

The rotor 3 is a rotor in the motor 1, and includes a rotating shaft 3a and a magnet 3b. The rotor 3 has an outside diameter B the ratio of which to the outside diameter A of the stator 2 is equal to or less than 0.3. The magnet 3b is a tubular permanent magnet, and is fixed to the outer peripheral surface of the rotating shaft 3a. For the magnet 3b, a ferrite magnet and a neodymium magnet, for example, can be used. The outer peripheral surface of the magnet 3b faces the teeth 2b with a predetermined gap 50 (hereinafter, referred to as an air gap 50) left therebetween. That is to say, the motor 1 is of an inner rotor type.

The motor 1 according to the embodiment, by optimizing a dimensional ratio of the outside diameter A of the stator 2, the outside diameter B of the rotor 3, an inside diameter C of the stator 2, and a thickness D of the yoke 2a, reduces a loss in the motor 1, such as an iron loss and a copper loss.

Specifically, in the motor 1 according to the embodiment, the ratio of the thickness D of the yoke 2a to the outside diameter A of the stator 2 is 0.1 to 0.15. Simulation results relating to this point will be described later with reference to FIG. 2 to FIG. 4.

In the motor 1 according to the embodiment, the ratio of the air gap 50 to the outside diameter A of the stator 2 is 0.042 to 0.064. Simulation results relating to this point will be described later with reference to FIG. 5 and FIG. 6.

Figure 4:
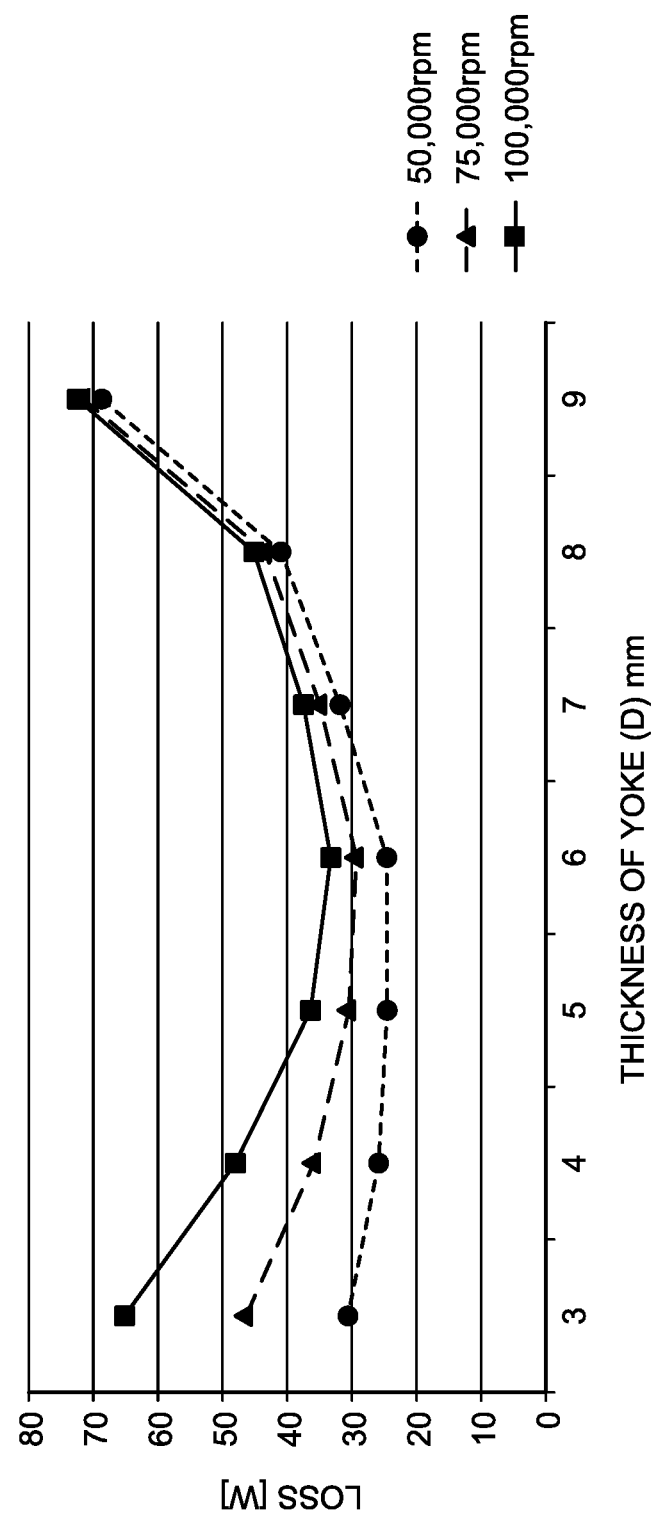
FIG. 4 is a diagram illustrating a result of a simulation in which the thickness of the yoke is varied.

The impact of the thickness D of the yoke 2a in the stator 2 on a loss will be described next with reference to FIG. 2 to FIG. 4. FIG. 2 to FIG. 4 are diagrams illustrating results of a simulation in which the thickness D of the yoke 2a is varied. Results of a simulation will be described first with reference to FIG. 2 and FIG. 3 in a case in which the motor 1 is rotated at 100,000 rpm. A measurement point P1 illustrated in FIG. 2 indicates a location at which the magnetic flux density is measured in the simulation.

FIG. 2 illustrates dimensional conditions for the stator 2 and the rotor 3 in the simulation. Specifically, the outside diameter A of the stator 2 is fixed at 47 mm, the outside diameter B of the rotor 3 at 12 mm, and the inside diameter C of the stator 2 at 18 mm in the simulation. The thickness D of the yoke 2a in the stator 2 is then varied between 3 mm and 9 mm.

The chart illustrated in FIG. 2 indicates the "air gap", the "stator magnetic flux density", the "iron loss (predicted value)", the "winding space", the "number of winding turns", the "M/W diameter", the "standard sheath outside diameter", the "space factor", the "M/W conductor resistance value", and the "coil resistance value".

The "air gap" indicates the length in the radial direction of the gap (the air gap 50) between the rotor 3 and the teeth 2b. The "stator magnetic flux density" indicates the magnetic flux density of the stator 2 at the measurement point P1. The "iron loss (predicted value)" indicates the predicted value for an iron loss calculated based on the magnetic flux density. The "winding space" indicates the cross section area of the coil 2c when viewed in cross section (FIG. 1, for example). The "number of winding turns" indicates the number of turns when the coil 2c is wound around the teeth 2b. The "M/W (magnet wire) diameter" indicates the length of the diameter of the conducting wire of the coil 2c excluding the insulating sheath (that is, metal wire). The "standard sheath outside diameter" indicates the length of the diameter of the conducting wire of the coil 2c including the insulating sheath. The "space factor" indicates the ratio of the coil 2c that occupies the "winding space". The "M/W conductor resistance value" indicates the resistance value for the metal wire in the coil 2c. The "coil resistance value" indicates the resistance value for the coil 2c.

As illustrated in FIG. 2, the number of turns (the winding number) and the space factor of the coil 2c are fixed in the simulation. In other words, the winding space is reduced with an increase in the thickness D of the yoke 2a, so that the M/W diameter, that is to say, the metal wire of the conducting wire is made thin in order to keep the space factor constant.

FIG. 3 is a graph illustrating the copper loss, the iron loss, the total loss, and the magnetic flux density in the simulation result. In this graph, the vertical axis shows values for each parameter, and the horizontal axis shows the thickness D of the yoke 2a. For detailed numeric values of the iron loss and the magnetic flux density illustrated in FIG. 3 refers to the "iron loss (predicted value)" and the "stator magnetic flux density" in FIG. 2.

The mathematical formula for the copper loss is expressed as the copper loss=$I^2 \times R$, where the current value is I, and the resistance value for the coil 2c is R. The iron loss is a total value of an eddy-current loss and a hysteresis loss, and in general, the eddy-current loss in particular is increased compared with the hysteresis loss under a condition of high-speed rotation at 100,000 rpm, for example. The mathematical formula for the eddy-current loss is expressed as $Pe=ke(t \cdot f \cdot Bm)^2/\rho$, where the eddy-current loss is Pe, the proportionality constant is ke, the thickness is t, the frequency is f, the maximum magnetic flux density is Bm, and the resistivity of the stator 2 is $\rho$. The total loss is a total value of the copper loss and iron loss.

As illustrated in FIG. 3, the copper loss is increased with an increase in the thickness D of the yoke 2a in the range of the thickness D of the yoke 2a from 3 mm to 9 mm. This is because making the yoke 2a thicker reduces the winding space. Thus, the conducting wire of the coil 2c is made thin so as to ensure the same number of turns of the coil. Specifically, a thinner conducting wire increases the resistance value for the coil 2c, resulting in a higher temperature of the coil 2c, which increases the loss.

Meanwhile, the iron loss is decreased with an increase in the thickness D of the yoke 2a. This is because making the yoke 2a thicker reduces the magnetic flux density. Specifically, a lower magnetic flux density reduces the eddy-current loss, thereby preventing a rise in the temperature of the coil 2c as a result, which decreases the loss.

The total loss is decreased with an increase in the thickness of the yoke 2a in the range of the thickness D of the yoke 2a from 3 mm to 6 mm. This is because a decrease in the iron loss is more remarkable than an increase in the copper loss in the range of the thickness D of the yoke 2a from 3 mm to 6 mm. By contrast, the total loss is increased with an increase in the thickness D of the yoke 2a in the range of the thickness D of the yoke 2a from 6 mm to 9 mm. This is because an increase in the copper loss is more remarkable than a decrease in the iron loss in the range of the thickness D of the yoke 2a from 6 mm to 9 mm.

Additionally, for a rise in the temperature resulting from heat generation of the motor 1, the rise value in a case in which the thickness D of the yoke 2a is 6.0 mm is lower than that in a case in which the thickness D of the yoke 2a is with 4.5 mm, as illustrated in FIG. 3. That is to say, a rise in the temperature resulting from heat generation of the motor 1 tends to be prevented more with an increase in the thickness D of the yoke 2a.

Consequently, the simulation results illustrated in FIG. 2 and FIG. 3 demonstrate that the thickness D of the yoke 2a is preferably between 5 mm and 7 mm. In other words, the ratio of the thickness D of the yoke 2a to the outside diameter A of the stator 2 is preferably 0.1 to 0.15. In this manner, the loss (total loss) can be reduced during high-speed rotation at 100,000 rpm, for example.

Furthermore, the thickness D of the yoke 2a is preferably close to 6 mm, considering the temperature rise values. That is to say, the thickness D of the yoke 2a is preferably about 6 mm (the ratio thereof to the outside diameter A of the stator 2 is about 0.127).

In a case in which the outside diameter A of the stator 2 is 47 mm, when the thickness D of the yoke 2a is 5 mm to 7 mm, the ratio thereof is about 0.106 to about 0.148 to be exact. The ratio of the thickness D of the yoke 2a, however, has been taken as 0.1 to 0.15 as mentioned above, taking into account that a manufacturing error of a couple of percent exists in the outside diameter A of the stator 2 and the thickness D of the yoke 2a.

The outside diameter A of the stator 2 is not limited to 47 mm, and may be equal to or less than 50 mm. The outside diameter B of the rotor 3 may also be a length that satisfies the ratio thereof to the outside diameter A of the stator 2 being equal to or less than 0.3 times.

Although FIG. 3 illustrates the simulation result in a case in which the rotational speed is 100,000 rpm, the rotational speed does not need to be exactly 100,000 rpm, and substantially the same simulation result can be obtained with a rotational speed in the range of ±10%. That is to say, if the rotational speed is in the range from 90,000 rpm to 110,000 rpm, substantially the same simulation result can be obtained as that with a rotational speed of 100,000 rpm.

Furthermore, if the rotational speed is equal to or greater than 50,000 rpm, a simulation result that has the same tendency as that with 100,000 rpm can be obtained. This point will be described with reference to FIG. 4.

FIG. 4 illustrates respective total losses in cases in which the rotational speeds are 50,000 rpm, 75,000 rpm, and 100,000 rpm. The outside diameter A of the stator 2, the outside diameter B of the rotor 3, the inside diameter C of the stator 2, and the thickness D of the yoke 2a are the same at all of the three rotational speeds (see FIG. 2).

As illustrated in FIG. 4, in the range of the thickness D of the yoke 2a from 3 mm to 6 mm, the total loss is decreased with an increase in the thickness of the yoke 2a regardless of the rotational speed. Additionally, the total loss is smaller with a lower rotational speed in the range of the thickness D of the yoke 2a from 3 mm to 6 mm. This is because the iron loss is decreased with a decrease in the rotational speed, while the copper loss does not change (because the current value and the coil resistance value are not changed).

As illustrated in FIG. 4, in the range of the thickness D of the yoke 2a from 6 mm to 9 mm, the total loss is increased with an increase in the thickness of the yoke 2a regardless of the rotational speed.

As illustrated in FIG. 4, in a case in which the thickness D of the yoke 2a is 6 mm, the total losses have the lowest values at all of the three rotational speeds. That is to say, in a case in which the rotational speed is equal to or greater than 50,000 rpm, setting the thickness D of the yoke 2a at 5 mm to 7 mm can reduce the total loss. In other words, the ratio of the thickness D of the yoke 2a to the outside diameter A of the stator 2 is preferably 0.1 to 0.15.

A simulation result will be described next with reference to FIG. 5 and FIG. 6 in which the inside diameter C of the stator 2 is varied. FIG. 5 is a diagram illustrating conditions for the simulation in which the inside diameter C of the stator 2 is varied. FIG. 6 is a diagram illustrating the result of the simulation in which the inside diameter C of the stator 2 is varied.

As illustrated in FIG. 5, the outside diameter A of the stator 2 is fixed at 47 mm, the outside diameter B of the rotor 3 at 12 mm, and the thickness D of the yoke 2a at 7 mm in the simulation.

The inside diameter C of the stator 2 is then varied by 2 mm in the range from 14 mm to 22 mm. In other words, the air gap 50 is varied between 1 mm and 5 mm, as illustrated in FIG. 5. FIG. 5 also illustrates a measurement point P2 for the magnetic flux density of the stator 2.

FIG. 6 is a graph illustrating the copper loss, the iron loss, the total loss, and the magnetic flux density in the simulation result. In this graph, the vertical axis shows values for each parameter, and the horizontal axis shows the inside diameter C of the stator 2.

As illustrated in FIG. 6, the magnetic flux density is decreased with an increase in the inside diameter C in the range of the inside diameter C of the stator 2 from 14 mm to 22 mm. Thus, the iron loss is also decreased with an increase in the inside diameter C in like manner.

By contrast, the copper loss is increased with an increase in the inside diameter C in the range of the inside diameter C of the stator 2 from 14 mm to 22 mm. As illustrated in FIG. 6, the total loss is also increased with an increase in the inside diameter C in the range of the inside diameter C of the stator 2 from 14 mm to 22 mm.

This is because, in the range of the inside diameter C of the stator 2 from 14 mm to 22 mm, the iron loss is decreased relatively gently, whereas the copper loss is increased relatively abruptly. Specifically, the copper loss is increased more abruptly at the point at which the inside diameter C of the stator 2 is 18 mm.

Additionally, for a rise in the temperature resulting from heat generation of the motor 1, the rise value in a case in which the inside diameter C is 18 mm (the air gap is 3.0 mm) is lower than that in a case in which the inside diameter C is 15 mm (the air gap is 1.5 mm), as illustrated in FIG. 6. That is to say, a rise in the temperature resulting from heat generation of the motor 1 tends to be prevented more with an increase in the inside diameter C of the stator 2 (that is, with an increase in the air gap 50).

Consequently, the simulation result illustrated in FIG. 6 demonstrates that the inside diameter C of the stator 2 is preferably between 16 mm and 18 mm, that is to say, the air gap 50 is preferably between 2 mm and 3 mm. In other words, the ratio of the air gap 50 to the outside diameter A of the stator 2 is preferably 0.042 to 0.064.

Furthermore, the air gap 50 is preferably close to 3 mm, considering the temperature rise values. That is to say, the inside diameter C of the stator 2 is preferably between 17 mm and 18 mm, and the air gap 50 is preferably between 2.5 mm and 3.0 mm.

In a case in which the outside diameter A of the stator 2 is 47 mm, when the air gap 50 is 2 mm to 3 mm, the ratio thereof is about 0.0425 to about 0.0638 to be exact. The ratio of the air gap 50, however, has been taken as 0.042 to 0.064 as mentioned above, taking into account that a manufacturing error of a couple of percent exists in the outside diameter A of the stator 2, the inside diameter C, and the outside diameter B of the rotor 3.

As described above, the motor 1 according to the embodiment includes the stator 2 and the rotor 3. The stator 2 includes the yoke 2a and the teeth 2b that protrude from the yoke 2a. The rotor 3 has the outside diameter B the ratio of which to the outside diameter A of the stator 2 is equal to or less than 0.3. The stator 2 has the thickness D of the yoke 2a the ratio of which to the outside diameter A of the stator 2 is 0.1 to 0.15. In this manner, the loss can be reduced during high-speed rotation.

In the motor 1 according to the embodiment, the outside diameter A of the stator 2 is equal to or less than 50 mm. In this manner, even in a case in which the motor 1 is relatively small, the loss can be reduced and motor efficiency can be improved.

In the motor 1 according to the embodiment, the stator 2 has the air gap 50 formed between the teeth 2b and the rotor 3, and the ratio of the air gap 50 to the outside diameter A of the stator 2 is 0.042 to 0.064. In this manner, even with the air gap 50 relatively widened, the loss can be reduced and motor efficiency can be improved.

In the motor 1 according to the embodiment, the rotational speed is equal to or greater than 50,000 rpm. In this manner, the loss can be reduced even during high-speed rotation.

The present invention is not limited by the aforementioned embodiment. The present invention also includes any invention that is constituted through combination of the components described above, as appropriate. A person skilled in the art can easily derive further effects and modifications. Therefore, a wider range of aspects of the present invention is not limited by the aforementioned embodiment, and various changes can be made.

REFERENCE SIGNS LIST 1 motor
2 stator

2*a* yoke
2*b* teeth
2*c* coil
3 rotor
3*a* rotating shaft
3*b* magnet
50 air gap

The invention claimed is:

1. A motor comprising:
a stator including a yoke and teeth that protrude from the yoke; and
a rotor having an outside diameter a ratio of which to an outside diameter of the stator is equal to or less than 0.3, wherein
the stator has a thickness of the yoke a ratio of which to the outside diameter of the stator is 0.1 to 0.15, and the stator has an air gap formed between the teeth and the rotor, and a ratio of the air gap to the outside diameter of the stator is 0.042 to 0.064.

2. The motor according to claim 1, wherein the outside diameter of the stator is equal to or less than 50 mm.

3. The motor according to claim 1, wherein a rotational speed of the motor is equal to or greater than 50,000 rpm.

\* \* \* \* \*